(12) United States Patent
Shah

(10) Patent No.: US 9,001,355 B2
(45) Date of Patent: Apr. 7, 2015

(54) METHODS AND STRUCTURE FOR SIMPLIFIED ENTERPRISE PRINTING FROM MOBILE DEVICES

(75) Inventor: Zarana Shah, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1022 days.

(21) Appl. No.: 12/845,648

(22) Filed: Jul. 28, 2010

(65) Prior Publication Data
US 2012/0026536 A1 Feb. 2, 2012

(51) Int. Cl.
*G06F 15/00* (2006.01)
*G06F 3/12* (2006.01)

(52) U.S. Cl.
CPC ............ *G06F 3/1288* (2013.01); *G06F 3/1206* (2013.01); *G06F 3/1247* (2013.01); *G06F 3/1292* (2013.01)

(58) Field of Classification Search
CPC ... G06F 3/1206; G06F 3/1247; G06F 3/1288; G06F 3/1292
USPC .................................................. 358/1.1, 1.15
See application file for complete search history.

(56) References Cited

U.S. PATENT DOCUMENTS

| | | | |
|---|---|---|---|
| 6,201,611 B1 | 3/2001 | Carter et al. | |
| 2003/0093490 A1* | 5/2003 | Yamamoto et al. | 709/213 |
| 2003/0142345 A1* | 7/2003 | Bunn et al. | 358/1.15 |
| 2004/0100651 A1* | 5/2004 | Leone et al. | 358/1.15 |
| 2008/0084578 A1* | 4/2008 | Walker et al. | 358/1.15 |
| 2011/0085196 A1* | 4/2011 | Liu et al. | 358/1.15 |

FOREIGN PATENT DOCUMENTS

| | | |
|---|---|---|
| EP | 1309170 A2 | 5/2003 |
| EP | 1331549 A2 | 7/2003 |
| EP | 1422609 A2 | 5/2004 |
| WO | 2006062864 A2 | 6/2006 |

* cited by examiner

*Primary Examiner* — King Poon
*Assistant Examiner* — Iriana Cruz
(74) *Attorney, Agent, or Firm* — Duft Bornsen & Fettig LLP

(57) ABSTRACT

Methods and structure for flexible printing of documents from a mobile device in a printing enterprise. The mobile device is coupled with a remote print server through a public network and coupled with one or more printers of the enterprise through a private network. The mobile device serves as an intermediate device such that the printer is not connected directly to the remote print server. A user of the mobile device identifies a document to be printed and sends information relating to the identified document over the public network to the remote print server. The server renders the document and returns the rendered document to the mobile device that, in turn, transmits the rendered document to the printer over the private network to cause the document to be printed. Further, the user may select the printer by physically locating a preferred printer (in close proximity and/or equipped/configured as desired).

17 Claims, 9 Drawing Sheets

ME METHODS AND STRUCTURE FOR
SIMPLIFIED ENTERPRISE PRINTING FROM
MOBILE DEVICES

RELATED PATENT APPLICATIONS

This patent is related to commonly owned, co-pending, U.S. patent application Ser. No. 12/539,698, entitled METHODS AND SYSTEMS FOR PROVIDING DEVICE SPECIFIC PRINT OPTIONS TO REMOTE PRINTING SERVICES, filed 12 Aug. 2009, which is hereby incorporated by reference

BACKGROUND

1. Field of the Invention

The invention relates generally to printing from mobile devices in a printing environment and more specifically relates to methods and structure for simplifying the selection of a printing system for printing from a mobile device within a printing enterprise.

2. Discussion of Related Art

In large printing environments, a large number of printing devices/systems may be presented for use by a user of a client device (e.g., a personal computer or workstation). In such a traditional environment, the user sitting at his client device using an application program to generate a desired document selects a printer for printing his print job. Printer driver or other software in the client device may then format the print job for printing on the selected printing device/system. The driver or other software may present the user with a dialog box or screen allowing the user to select particular printer settings or print job setting to format the print job as he desires.

In an older, traditional printing environment, the user tends to be stationary at his client device (i.e., sitting at his desktop personal computer in his assigned cubicle or office). In such traditional environments, the printers available to a user may be predetermined based on the user's location in the enterprise. For example, printing systems on his floor or within his group of the enterprise may be the only printers readily available to a user, or the only printers that are convenient to access from the user's desk, or the printers with which the user is familiar, etc.

More recently, portable client devices have substantially gained in popularity. Portable or mobile client devices may include, for example, smart phones (including iPhones, Windows Mobile phones, DROID phones, etc.), personal digital assistants, net-book computers or other portable computer systems, etc. Such portable or mobile devices may be wirelessly coupled to the internal network (e.g., the intranet) as well as the environment outside the printing enterprise (e.g., through the Internet). Given this added mobility of the user and the client device, the traditional paradigm of pre-defining particular printers for use by a stationary user is cumbersome and inconvenient. Still further, most mobile devices lack the computational power to provide for rendering of documents to be printed on a printer wirelessly coupled to the mobile device. In fact, most present day mobile devices do not even include a printing subsystem or specific printer drivers in their operating software. Thus, a print server computing node may be required to provide the needed computational power for rendering the document to be printed. The mobile device may therefore be coupled with a print server for rendering the document to print. The print server may then be coupled with the printers of the enterprise to deliver the rendered documents to the printer.

One prior solution named "FollowMe"® printing (by Ringdale Inc. with information available at www.ringdale.com/followme) provides some added flexibility for the user of a workstation or personal computer (a client device). However, the "FollowMe" approach requires that the print server and the printer are within the same network (or at least can access one another through some network connection). The client device interacts with the print server to identify one or more documents to be printed. The user then logs onto the printer (using typical user credentials and authentication services of the enterprise) and the printer retrieves from the FollowMe remote print server the documents (rendered by the print server) identified by the user. Thus, the printer and the remote print server must be on the same network (or at least able to access one another) to allow the printer to retrieve the rendered document.

Though these prior solutions provide some added flexibility, they raise other problems. For example, the FollowMe approach requires that the enterprise include a print server computing node to receive print job requests from the client devices, to render the documents of the print job, and to transmit the rendered print job documents to the printer. However, if the enterprise does not include such a print server within its enterprise intranet (i.e., too costly in smaller print environments) then a print server external to the enterprise internal network may be required by the client device (i.e., a remote print server coupled with the client device through the Internet—e.g., a "cloud print server"). However, for security of the printing enterprise, the printers in the enterprise may not be accessible on the Internet thus raising additional problems and challenges for printing from client devices using a remote print server.

Thus, it is an ongoing challenge to improve the flexibility for use of printing systems in an enterprise by mobile users using mobile or portable client devices.

SUMMARY

The present invention solves the above and other problems, thereby advancing the state of the useful arts, by providing methods and associated structure for using a mobile device in a printing enterprise to print documents on a printer of the enterprise while using a remote print server to render the document. A user of a mobile device may roam through the enterprise to manually (physically) select a nearby printer that is presently operable and configured to print a selected document. The mobile device is coupled through a public network to a remote print server (e.g., a cloud print server on the Internet) and is coupled through a private network of the enterprise to a printer. Thus, the mobile device serves as an intermediate device to print a document using a public, remote print server while the printer used is secured within the printing enterprise.

One aspect hereof provides a method and a computer readable medium embodying the method for printing a document with a mobile device in a printing enterprise. The method comprising obtaining within the mobile device printer information from a printer coupled with the mobile device over a private network and obtaining within the mobile device document information identifying a document to be printed. The method then transmits the printer information and the document information from the mobile device to a remote print server coupled with the mobile device over a public network separate from the private network. The method then receives within the mobile device from the remote print server over the public network a rendered document generated by the remote print server based on the document information and based on the printer information. The method then transmits the rendered document from the mobile device to the printer over the private network to cause the printer to print the rendered document.

Another aspect hereof provides a mobile device adapted for printing a document in a printing enterprise. The mobile device comprising a private network interface adapted for coupling the mobile device with a printer over a private network and a public network interface adapted for coupling the mobile device with a remote print server over a public network. The device further comprises a print job processor coupled with the private network through the private network interface and coupled with the public network through the public network interface. The processor is adapted to obtain document information identifying a document to be printed and is further adapted to transmit the document information to the remote print server over the public network. The processor is further adapted to receive a rendered document from the remote print server over the public network and is further adapted to transmit the rendered document to the printer over the private network to cause the printer to print the rendered document.

BRIEF DESCRIPTION OF THE DRAWINGS

The same reference number represents the same element or same type of element on all drawings.

DETAILED DESCRIPTION OF THE DRAWINGS

FIGS. 1 through 10 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
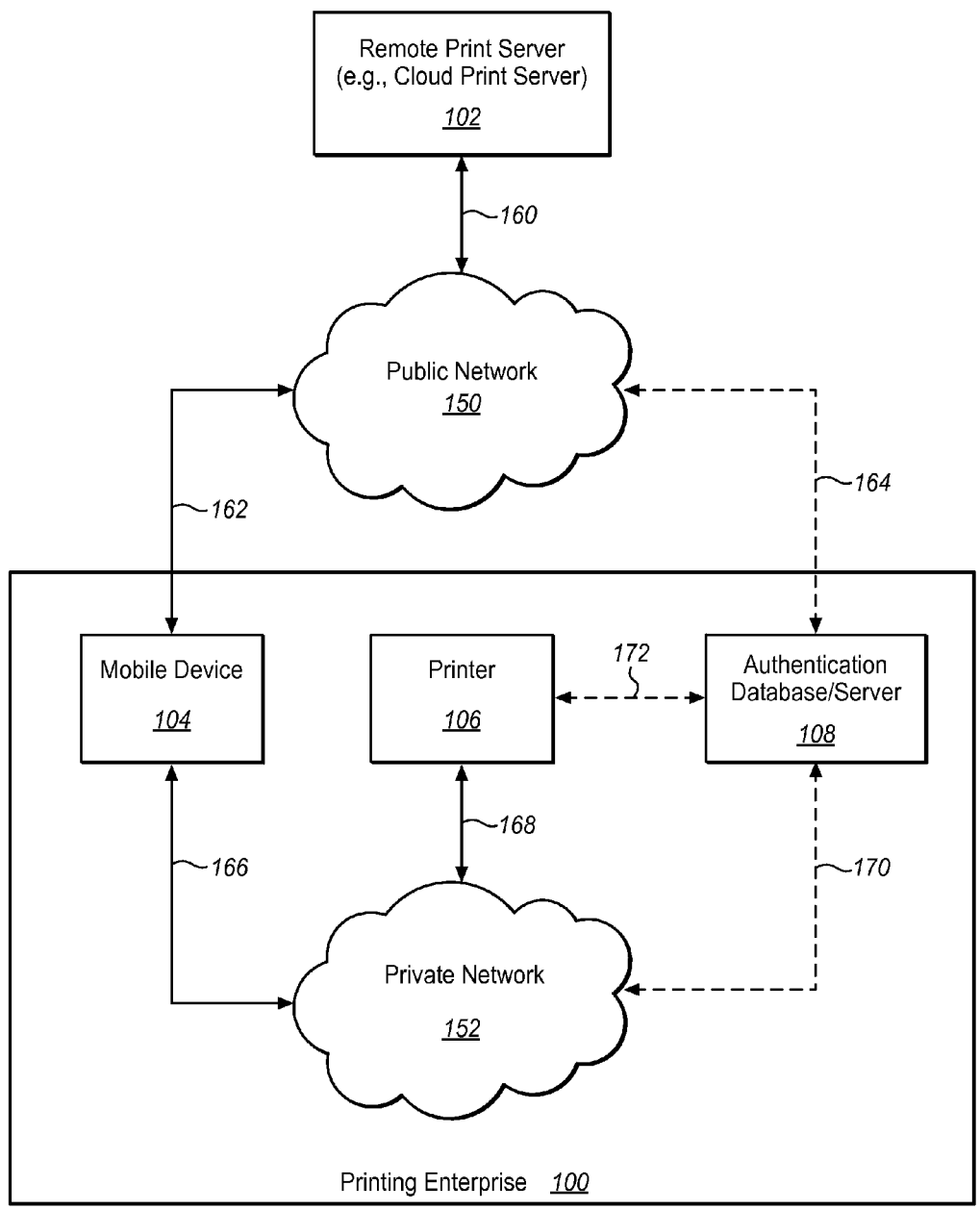
FIG. 1 is a block diagram of an exemplary printing enterprise and remote print server embodying features and aspects hereof to improve flexibility for mobile device user in an enterprise to use printers of the enterprise and remote print servers.

FIG. 1 is a block diagram of an exemplary printing enterprise 100 adapted to improve usability and flexibility for users of mobile devices 104 printing documents on printers 106 of the enterprise 100. Printing enterprise 100 includes one or more mobile devices 104 and one or more printers 106 coupled through private network 152 (via communication paths 166 and 168, respectively). Mobile device 104 may be any portable or mobile user device such as a Windows Mobile phone, an iPhone, a smart phone, a personal digital assistant, as well as a variety of portable computer devices. Mobile device 104 couples with the private network 152 of enterprise 100 via communication path 166. Communication path 166 may be any suitable network or other communication medium and protocol including, for example, WiFi, Bluetooth, etc. Printer 106 may be any of several standard commercially available printing systems including, for example, inkjet printers, laser printers, multi-function devices incorporating laser or inkjet printing, etc. Printer 106 couples with private network 152 via communication path 168. Communication path 168 may be any suitable network or other communication medium and protocol including, for example, Ethernet, WiFi, etc.

As noted above, mobile device 104 typically does not provide its own printing services capabilities. Due to limited computational power and/or other design limitations such mobile devices tend to rely on external computational resources to format and render documents for printing. Thus, mobile device 104 may be coupled with remote print server 102 (often referred to as a "cloud print server") through public network 150. Remote print server 102 provides print services for mobile device 104 to format and render documents to be printed. In one exemplary embodiment, mobile device 104 may be coupled with remote print server 102 through public network 150 (e.g., the Internet). Mobile device 104 couples with public network 150 via path 162 which may comprise, for example, WiFi, 3G cellular data, or other well-known commercially available communication media and protocols. In like manner, remote print server 102 may couple with public network 150 via path 160 that may be an Ethernet communication path or other suitable, well-known, commercially available network or other communication medium and protocol.

Thus, the structure of FIG. 1 provides that mobile device 104 serves as an intermediate device between remote print server 102 (which formats and renders documents to be printed) and printer 106 (which imprints formatted and rendered documents). This structure provides desired security by excluding direct access from the Internet (e.g., public network 150) to printers 106 of a printing enterprise 100 while allowing a user of mobile device 104 to use printing services available on a public network.

In operation, a user of mobile device 104 may provide or otherwise obtain document information identifying a document to be printed. Further, mobile device 104 may obtain printer information from printer 106 indicating features and capabilities of printer 106 as presently configured and operable. Such printer information is often referred to as "printer capabilities". The printer information and document information so obtained by a user of mobile device 104 is then transmitted by mobile device 104 through public network 150 to remote print server 102. Remote print server 102 may then retrieve the document identified by the document information, format and render the identified document according to the capabilities of the printer indicated by the printer information, and then return the rendered document through public network 150 to mobile device 104. Mobile device 104 may then transmit the rendered document through private network 152 to printer 106 to permit the rendered document to be printed.

In one exemplary embodiment, the user of mobile device 104 may provide user credentials identifying the particular user to printer 106. Printer 106 then authenticates the user credentials to verify that the identified user is permitted to utilize printer 106. Printer 106 may perform such authentication validation by accessing authentication database/server 108 to verify the authenticity of the supplied user credentials. As well known in the art, user credentials may comprise a user ID and password, a PIN, or other suitable secure identification information. Still further, the authentication database/server 108 may associate the user information with addressing information regarding the authorized user's mobile device 104. Thus, for example, the addressing information may provide an IP address (or other communication address) of mobile device 104 associated with the authenticated, identified user. The printer information transmitted from printer 106 to the user's mobile device 104 may be directed over the private network 152 to the address indicated by the addressing information retrieved by printer 106 from authentication database/server 108.

Authentication database/server 108 may utilize any or all of various communication paths for its interaction in printing enterprise 100. For example, printer 106 may be directly coupled with authentication database/server 108 via path 172 and/or may be coupled with private network 152 via communication path 170. In addition, authentication database/server 108 may be coupled with public network 150 via network communication path 164. Each of these communication paths 164, 170, and 172 may utilize any of several well-known, commercially available communication media and protocols including, for example, Ethernet, WiFi, etc. Still further, authentication database/server 108 may be integrated within printer 106 such that printer 106 provides its own authentication services for user credentials provided by a user or may be distinct from printer 106 as another component of printing enterprise 100. The various options for connectivity and configuration of authentication database/server 108 provides for a corresponding variety of embodiments, some discussed below, for methods and message exchanges to effectuate the desired printing of a document originated by mobile device 104.

The exemplary structure of FIG. 1 therefore provides enhanced flexibility for printing from mobile device 104 in that the user of mobile device 104 may be physically mobile throughout printing enterprise 100 and still utilize a remote print server 108 accessible through a public network 150. Further, the user may manually select printer 106 based on physical proximity to the user and/or based on direct observation of the present configuration and operational status of printer 106. For example, the user of mobile device 104 may simply approach the nearest printer 106 that appears to be suitably configured and operational within enterprise 100. Since printer 106 may obtain the addressing information for mobile device 104 associated with the identified, authenticated user, printer 106 may establish communications with the user's mobile device using the addressing information provided in the authentication database/server 108. Thus, a user of a mobile device 104 is not constrained to utilizing only particular printers 106 of printing enterprise 100 in the traditional manner as that of users utilizing a stationary desktop computer or workstation in enterprise 100. Rather, the user of mobile device 104 may physically roam anywhere within printing enterprise 100 and utilize any desired, nearby, suitably configured, and presently operational printer 106.

Those of ordinary skill in the art will readily recognize numerous additional and equivalent elements in a fully functional printing enterprise 100 and remote print server 102 associated with the structure of FIG. 1. Such additional and equivalent elements are omitted herein for simplicity and brevity of this discussion.

Figure 2:
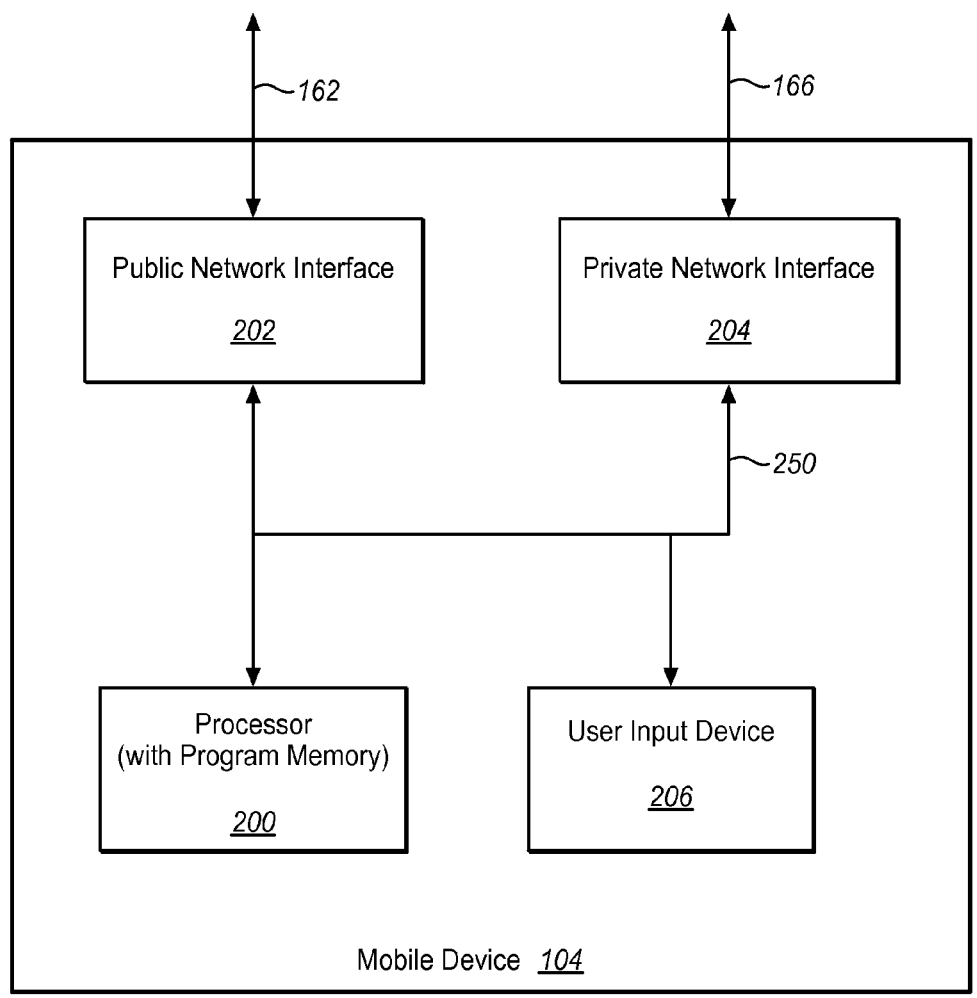
FIG. 2 is a block diagram providing exemplary additional details of a mobile device as may be used in the systems of FIG. 1

FIG. 2 is a block diagram describing exemplary additional details of mobile device 104 of FIG. 1. In general, mobile device 104 comprises a processor 200. Processor 200 may be any suitable general or special purpose programmable processor coupled with its associated program memory (not shown). For example, processor 200 may be the CPU and associated program memory within a Windows Mobile phone, an iPhone, a smart phone, or any other suitable portable device adapted for exchanging information over either of two networks. Thus, mobile device 104 comprises public network interface 202 adapted for coupling mobile device 104 with a public network via path 162. Further, mobile device 104 comprises private network interface 204 adapted for coupling mobile device 104 with the internal or private network of the printing enterprise via path 166. Those of ordinary skill in the art will readily recognize numerous, well known, readily available, components to implement features and aspects of network interfaces 202 and 204 including, for example, WiFi, Bluetooth, Ethernet, etc. Still further, mobile device 104 may include a user input device 206 adapted to provide user input to processor 200. Such an input device may be any suitable device for receiving user input including, for example, a keyboard, a touch screen, a mouse, a pointer device, or any other well-known user input device. Through user input device 206, a user of mobile device 104 may select a document to be printed and may direct the interaction through the public network interface 202 and the private network interface 204 to exchange information with the remote print server and printer, respectively, to effectuate printing of the selected document.

Those of ordinary skill in the art will readily recognize numerous additional and equivalent elements that may be present in a fully functional mobile device 104. Such additional and equivalent elements are omitted herein for simplicity and brevity of discussion.

Figure 3:
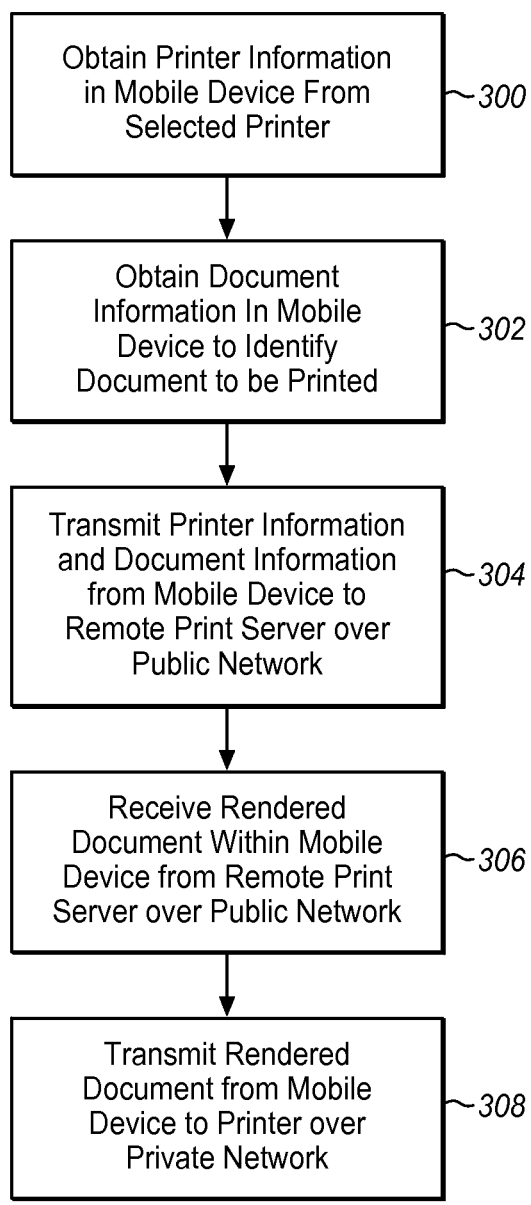
FIGS. 3 and 4 are flowcharts describing exemplary methods in accordance with features and aspects hereof to improve flexibility for mobile device user in an enterprise to use printers of the enterprise and remote print servers.

FIG. 3 is a flowchart describing an exemplary method operable in a printing enterprise such as printing enterprise 100 of FIG. 1 to improve flexibility for user's of mobile devices to use printers in a printing enterprise. More specifically, the steps of the method of FIG. 3 may be operable in a mobile device such as mobile device 104 of FIGS. 1 and 2. At step 300, a user obtains printer information in the mobile device from a selected printer. As noted above, a user may first select a printer by locating the physically closest and/or properly configured or equipped printer for printing a desired document. For example, a user may recognize that a particular document should be printed in color and in two-sided (duplex) form. Thus, a user may physically locate the nearest printer capable of printing such a color document in two-sided duplex form. Further, the user may observe that the selected printer is in a currently operable state and presently configured as required to correctly print a desired document. Having so manually selected a printer for printing the desired document, the user may obtain information regarding the printer within the mobile device from the selected printer. The printer information may comprise features and capabilities available in the printer including, for example, identification of the particular printer model and its presently configured options. Such printer information may be used subsequently by the remote print server for rendering the document to be printed.

At step 302, the mobile device's user obtains document information identifying the particular document to be printed. As noted above, the document information may identify a document residing on the storage of the mobile device itself or may identify a document stored elsewhere outside of the mobile device (e.g., elsewhere in the printing enterprise or even on a storage device accessible through the public network such as a cloud storage server coupled to the mobile device through the Internet). At step 304, the mobile device transmits the printer information and document information to the remote print server over the public network. Responsive to receipt of such information, the remote print server may then retrieve the document identified by the document information and perform appropriate processing to format and render the document in accordance with the features and capabilities of the printer identified by the printer information. At step 306, the mobile device receives the rendered document from the remote print server over the public network. At step 308, the mobile device transmits the rendered document received from the remote print server to the printer over the private network within the enterprise. Thus, as described above, the mobile device serves as an intermediate device coupled both to the remote print server through a public network and to the selected printer through a private network of the enterprise. This method therefore permits the printing enterprise to secure its printers from direct access to devices on a public network while still allowing a user of a mobile device to easily print documents utilizing the computational features of a remote print server accessible on the public network.

Figure 10:
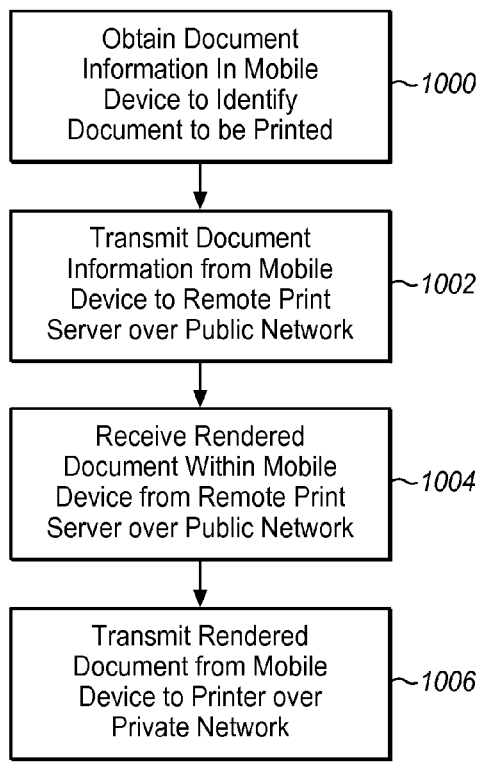
FIG. 10 is a flowchart describing another exemplary method in accordance with features and aspects hereof to improve flexibility for mobile device user in an enterprise to use printers of the enterprise and remote print servers.

FIG. 10 is a flowchart describing another exemplary method operable in a printing enterprise such as printing enterprise 100 of FIG. 1 to improve flexibility for user's of mobile devices to use printers in a printing enterprise. More specifically, the steps of the method of FIG. 10 may be operable in a mobile device such as mobile device 104 of FIGS. 1 and 2. At step 1000, the mobile device's user obtains document information identifying the particular document to be printed. As noted above, the document information may identify a document residing on the storage of the mobile device itself or may identify a document stored elsewhere outside of the mobile device (e.g., elsewhere in the printing enterprise or even on a storage device accessible through the public network such as a cloud storage server coupled to the mobile device through the Internet). At step 1002, the mobile device transmits the document information to the remote print server over the public network. Responsive to receipt of such information, the remote print server may then retrieve the document identified by the document information and perform appropriate processing to format and render the document. In the exemplary embodiment of the method of FIG. 10, the remote print server does not receive printer information regarding the capabilities of a specific selected printer on which the identified document is to be printed. Thus, in this exemplary embodiment, the remote print server may utilize a generic printer driver to format and render the identified document.

At step 1004, the mobile device receives the rendered document from the remote print server over the public network. At step 1006, the mobile device transmits the rendered document received from the remote print server to the printer over the private network within the enterprise. Thus, as described above, the mobile device serves as an intermediate device coupled both to the remote print server through a public network and to the selected printer through a private network of the enterprise. This method therefore permits the printing enterprise to secure its printers from direct access to devices on a public network while still allowing a user of a mobile device to easily print documents utilizing the computational features of a remote print server accessible on the public network.

Figure 4:
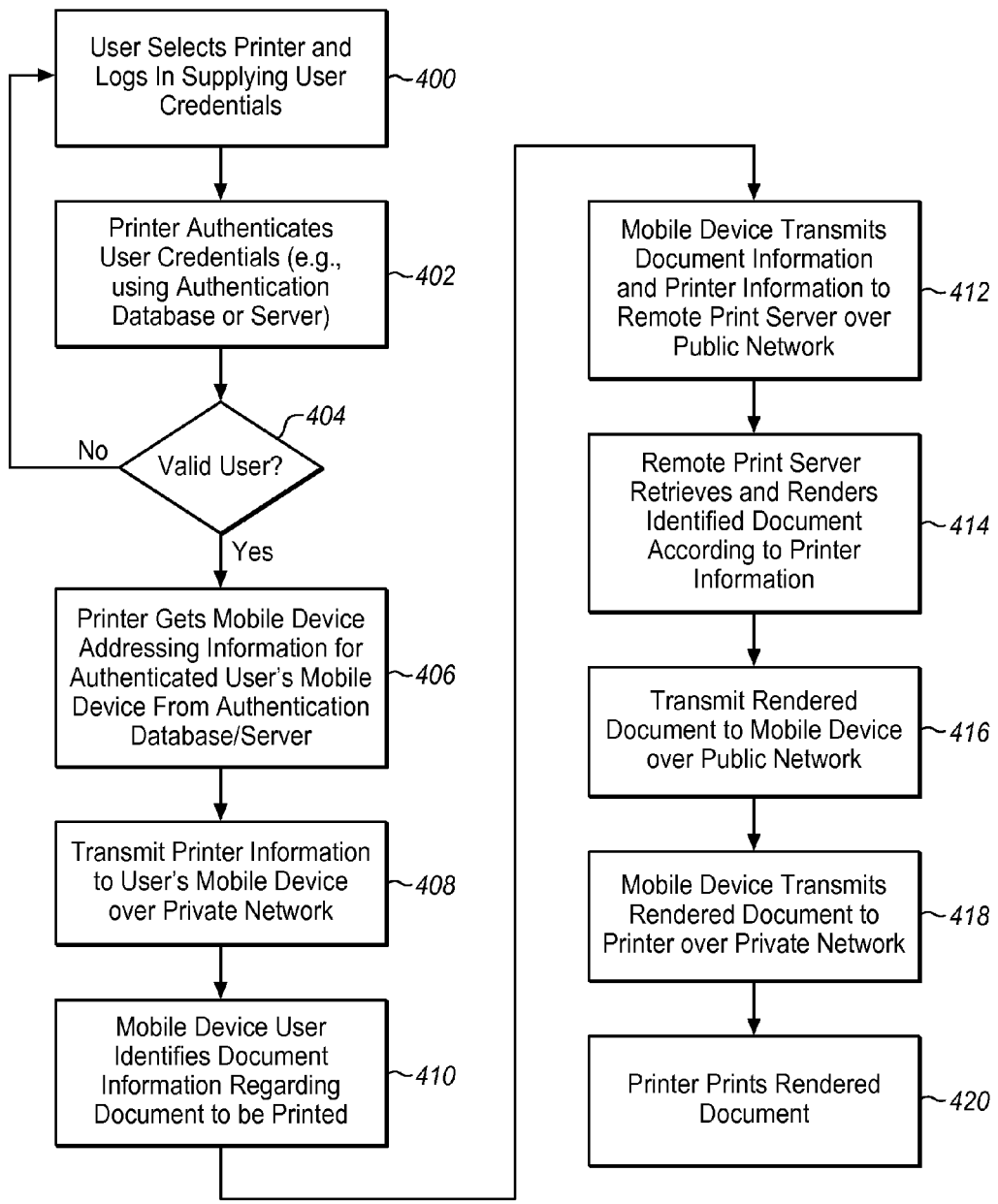

FIG. 4 is a flowchart providing another exemplary method to improve flexibility of printing from mobile devices in a printing enterprise in accordance with features and aspects hereof. The method of FIG. 4 may be operable in a printing enterprise such as enterprise 100 of FIG. 1. More specifically, the method of FIG. 4 describes steps operable within various components of the printing enterprise including, for example, a mobile device, a printer, and an authentication database/server within the printing enterprise. At step 400, a user selects a printer for printing a desired document and logs into the printer utilizing user credentials. As noted above, user credentials may comprise a user ID and password or other suitable security codes, PINs, or keys. Further, as noted above, the user may select an appropriate printer by physically locating the nearest printer suitably equipped and configured and in a proper operational state to permit printing of the desired document.

At step 402, the printer authenticates the user identified by the supplied user credentials. The authentication process may query an authentication database or server to determine that the identified user is permitted to utilize the selected printer. As noted above, the authentication database and/or server may be integrated within the printer or otherwise configured within the printing enterprise in a manner accessible to the printer. At step 404, the printer determines whether the authentication process validated the identified user or not. If not, processing continues looping back to the step 400 to await authentication of an appropriate user.

If the user credentials identify an authorized user, at step 406 the printer gets mobile device addressing information for the mobile device utilized by the authenticated identified user. The authentication database/server may provide such information indicating one or more mobile devices authorized for the identified user to access the selected printer within the printing enterprise. The addressing information provided from the authentication database/server may, for example, identify the IP address or other network address to be utilized in communications between the printer and the authorized user's mobile device. Utilizing the obtained addressing information, at step 408 the printer transmits printer information to the authorized user's mobile device over the private network. As noted above, the printer information may identify features and capabilities available with the selected printer for use in formatting and rendering a desired document to be printed. At step 410, the mobile device user identifies document information identifying the document to be printed. As noted above, the document to be printed may be stored within the mobile device, may be stored elsewhere within the printing enterprise, or may be stored outside the printing enterprise in a storage system accessible through the public network (e.g. a cloud storage server accessible through the Internet). The document information serves to identify the document. It may actually comprise the document data or may simply identify a location from which the document data may be retrieved (e.g., a Universal Resource Locator or URL identifying where the document to be printed is stored).

At step 412, the mobile device transmits the document information and the printer information to the remote print server over the public network. At step 414, the remote print server retrieves the document data identified by the document information (or actually provided within the document information) and renders the retrieved document data in accordance with the printer information received from the mobile device. Since the mobile device typically has limited computational capabilities and thus may simply be devoid of any printing subsystem capabilities, the remote print server serves to perform all processing to complete rendering of the selected document. At step 416, the remote print server transmits the rendered document to the mobile device over the public network. At step 418, the mobile device transmits the received rendered document to the selected printer over the private network within the printer enterprise and at step 420 of the printer prints of the rendered document received from the mobile device. Thus, the method of FIG. 4 provides improved flexibility for a user of a mobile device (i.e., a portable device devoid of local printing capabilities) to utilize printers within a printing enterprise that are otherwise inaccessible to public networks while utilizing computational resources of a remote server accessible on a public network to render the document to be printed.

Those of ordinary skill in the art will readily recognize numerous additional and equivalent steps that may be present in fully operational methods of FIGS. 3 and 4. Such additional and equivalent steps are omitted herein for simplicity and brevity of this discussion.

Figure 5:
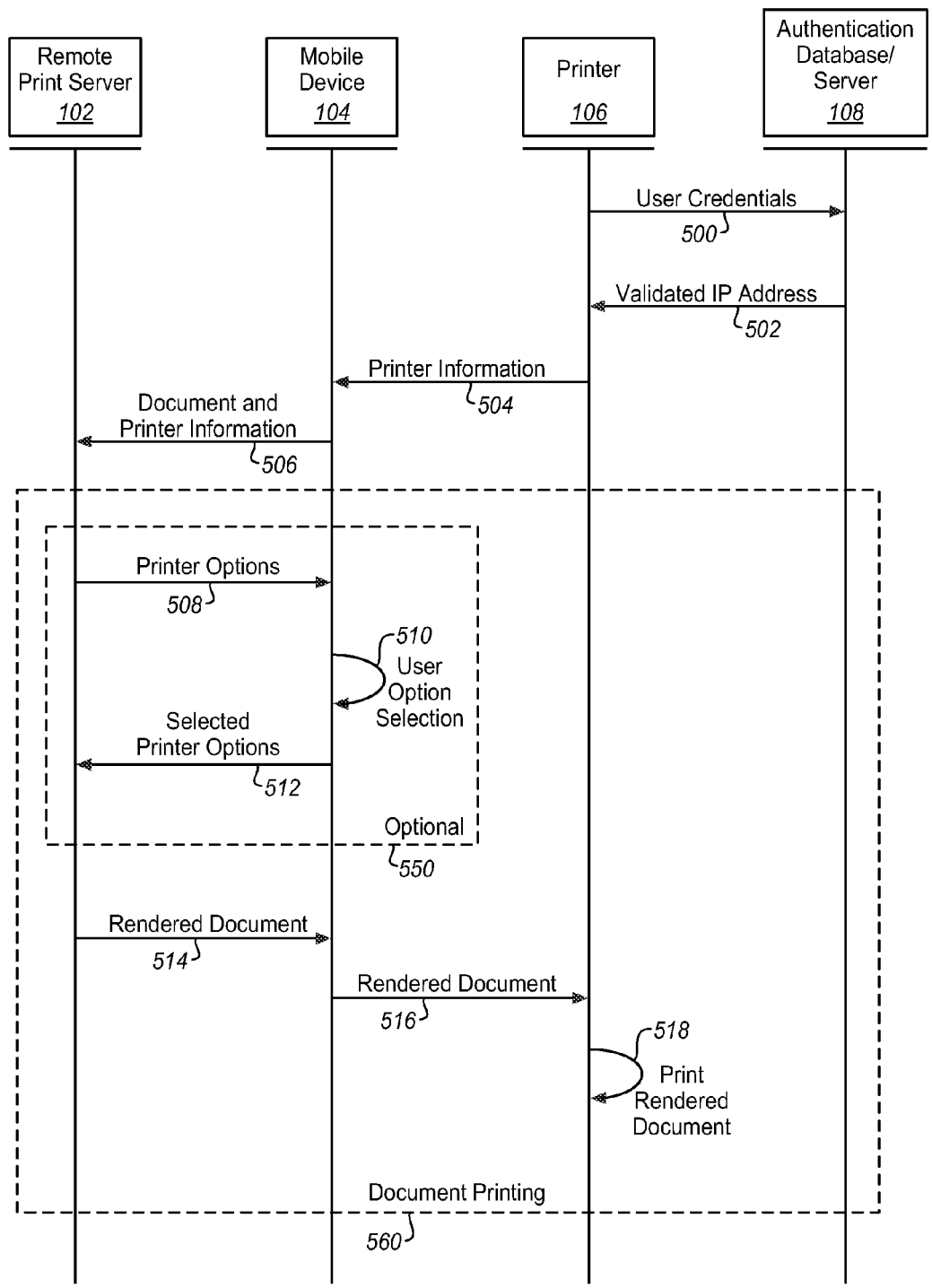
FIGS. 5 through 8 are diagrams of exemplary message exchanges between components of an enterprise and a remote print server in accordance with features and aspects hereof to improve flexibility for mobile device user in an enterprise to use printers of the enterprise and remote print servers.
Figure 6:
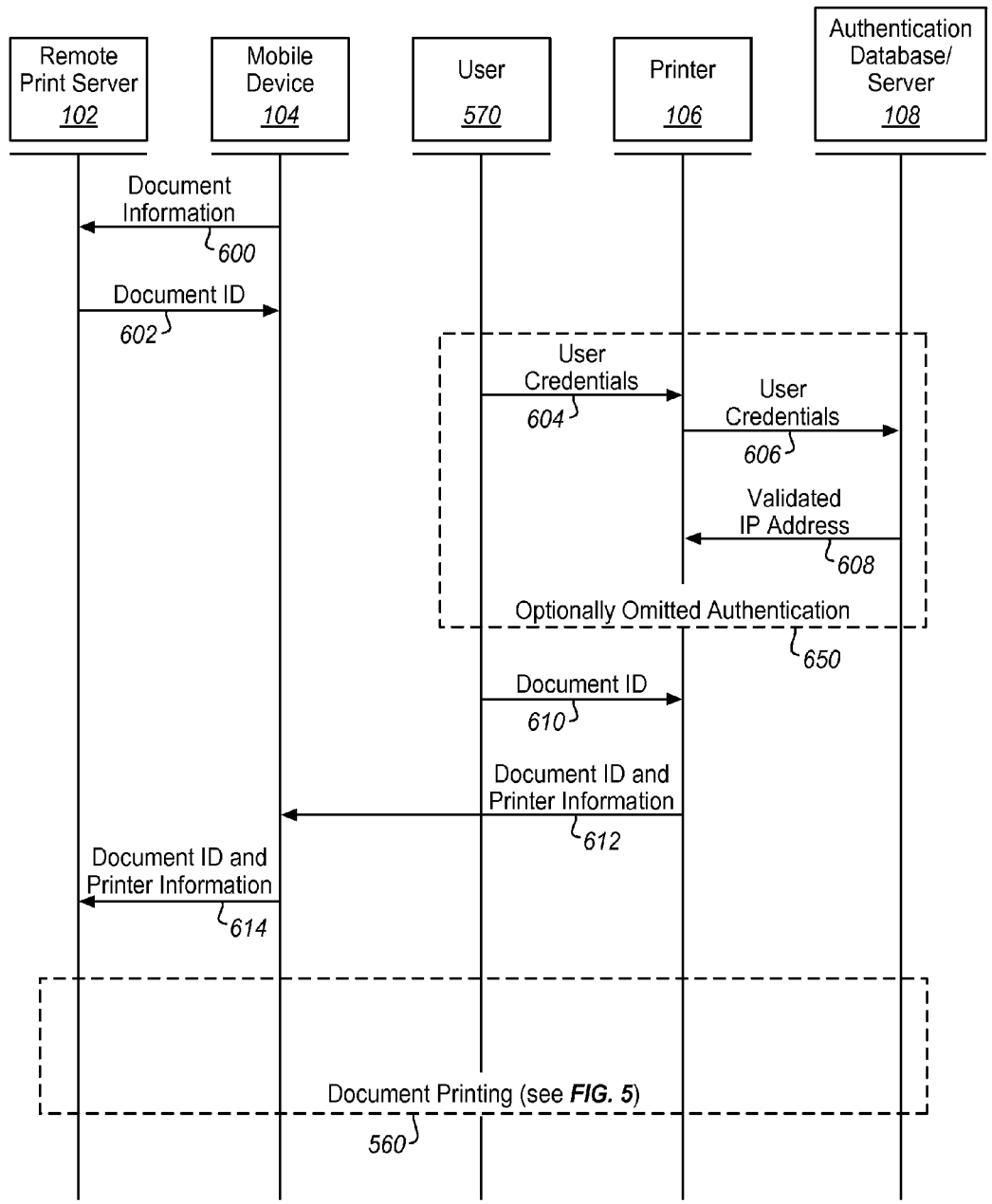
Figure 7:
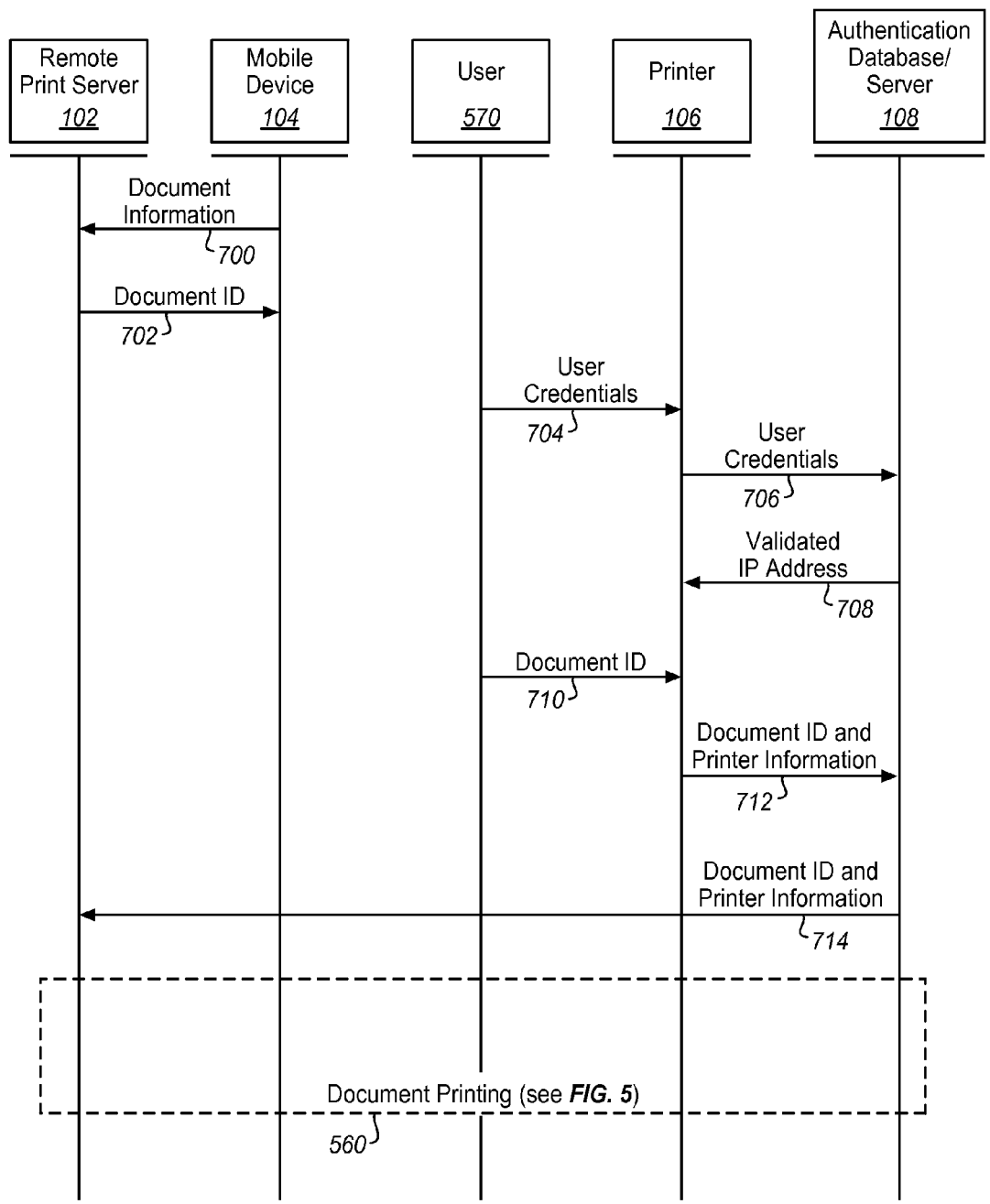

Features and aspects of the present invention may also be understood with reference to messages exchanged between the various components of the printing enterprise and a remote print server. FIGS. 5, 6, and 7 are diagrams describing exemplary message exchanges in accordance with exemplary embodiments that provide enhanced flexibility for users of mobile devices within a printing enterprise to utilize printers of the enterprise while also utilizing remote print server capabilities accessible through a public network. In FIGS. 5, 6, and 7, various components of the enterprise and the remote print server are labeled across the top of the figures. with vertical lines extending downward representing the advancing chronological sequence of messages. Horizontally directed arrows indicate particular messages exchanged between a first component and a second component. The direction of the arrow indicates the direction of the data being exchanged. Those of ordinary skill in the art will readily recognize a variety of well-known standard protocols that may be utilized for such exchanges including, for example, HyperText Transfer Protocol (HTTP) and other TCP/IP standard protocols.

Referring first FIG. 5, message 500 represents the transmission of user credentials from printer 108 to authentication database/server 108. As noted above, in one exemplary embodiment, the printer may receive user input as user credentials identifying the user requesting access to printer 108 within the printing enterprise. Authentication database/server 108 may then validate that the identified user is permitted to access printer 106 and, if so, returns the validated IP address (addressing information) as message 502 to printer 106. Utilizing the returned addressing information, printer 106 transmits a message 504 to mobile devices 104 to provide the printer information to the mobile device. A user of mobile device 104 identifies the document to be printed and thus mobile device 104 transmits message 506 to remote print server 102 providing the document information for the selected document and providing the printer information for the selected printer on which the identified document is to be printed.

As an optional feature, messages 508, 510, and 512 (collectively identified as optional messages 550) may provide specific selected user options for formatting and rendering the selected document. Specifically, message 508 is returned from remote print server 102 to mobile device 104 providing available printer options derived from the printer information. Printer options in message 508 may be formatted, for example, as a HyperText Markup Language (HTML) page to be presented on a display associated with mobile device 104. Message 510 then represents interaction between mobile device 104 and the authorized user to select among the available options. Message 512 is then transmitted from mobile device 104 to remote print server 102 indicating the particular selected printer options desired by the user of mobile device 104.

Utilizing the provided document information, the provided printer information, and optionally the provided selected printer options from the user, remote print server 102 renders the identified document and returns the rendered document as message 514 to mobile device 104. Mobile device 104 then transmits the rendered document as message 516 back to printer 106. Printer 106 then prints the rendered document as indicated by message 518 to produce the desired printed output for the user of mobile device 104.

Collectively the messages represented as 508 through 518 may be referred to in FIGS. 6 and 7 below as the document printing messages 560.

FIG. 6 depicts another exemplary message exchange in accordance with another exemplary embodiment of features and aspects hereof. In the variation of FIG. 6 relative to FIG. 5, an additional vertical line is shown representing actions by a user 570 to provide certain information in the exchange of messages. Message 600 is first transmitted from mobile device 104 to remote print server 102 to provide document information identifying a particular document selected by a user of mobile device 104. Remote print server 102 then associates a unique document ID with the identified document and returns the document ID as message 602 to mobile device 104. User 570 then interacts with printer 106 to provide user credentials in message 604. Printer 106 then transmits the supplied user credentials as message 606 to authentication database/server 108 to validate that the user identified by the supplied user credentials is authorized to utilize printer 106. If the user is properly authorized, authentication database/server 108 returns message 608 to printer 106 providing the validated IP address for mobile device 104 utilized by user 570. User 570 then forwards the document ID provided by the remote print server 102 to printer 106 as message 610. Printer 106 then returns the document ID and printer information as message 612 to mobile device 104. The provided document ID and printer information is then forwarded from mobile device 104 to remote print server 102 over a public network as message 614. The document ID may be provided with the printer information so that the remote print server can associate the provided printer information in message 614 with the document information previously provided in message 600. Remaining messages identified as document printing messages 560 as noted above in FIG. 5 may then proceed as above with respect to FIG. 5 complete the process of rendering and printing the identified document.

Messages 604, 606, and 608 provide for authentication of user 570 logging into printer 106, and may be referred to collectively as optionally omitted authentication 650. In one exemplary embodiment, these authentication steps may be optionally omitted where the printing enterprise does not require such security. Rather than authorization server/database 108 providing a validated IP address for printer 106 to communicate with mobile device 104, the document ID (returned to mobile device 104 from server 102 in message 602) may comprise addressing information for mobile device 104.

Examples of such document IDs comprising addressing information are discussed further herein below. When user 570 provides the document ID to printer 106 in message 610, printer 106 may use the addressing information in the document ID to communicate further with mobile device 104.

FIG. 7 is another exemplary message exchange diagram representing still another exemplary embodiment of features and aspects hereof to provide for flexible printing for a mobile device user in a printing enterprise. The message exchange of FIG. 7 is similar to FIG. 6 but provides that authentication database/server 108 directly communicates with remote print server 102 to provide the requisite printer information to permit the rendering of an identified document. In particular, message 700 is transmitted from mobile device 104 to remote print server 102 providing the document information for the document to be printed as identified by a user of mobile device 104. Message 702 is returned from remote print server 102 to mobile device 104 providing the assigned unique document ID associated with the document information by the remote print server. User 570 of mobile device 104 then transmits message 704 comprising the user credentials identifying user 570 to printer 106. Printer 106 then transmits the user credentials as message 706 to authentication database/server 108. If the user associated with the provided user credentials is authorized to utilize printer 106, database/server 108 returns the validated IP address for mobile device 104 as message 708 to printer 106. User 570 may then transmit the document ID as message 710 to printer 106. Printer 106 then forwards the document ID received from user 570 and the printer information associated with printer 106 to authentication database/server 108 as message 712.

In this exemplary embodiment, authentication database/server 108 is capable of directly coupling with remote print server 102 through the public network and thus provides the document ID and printer information directly to remote print server 102 as message 714.

The remaining message exchanges collectively referred to as document printing messages 560 from FIG. 5 may then be exchanged to complete the rendering and printing of the selected document.

Figure 8:
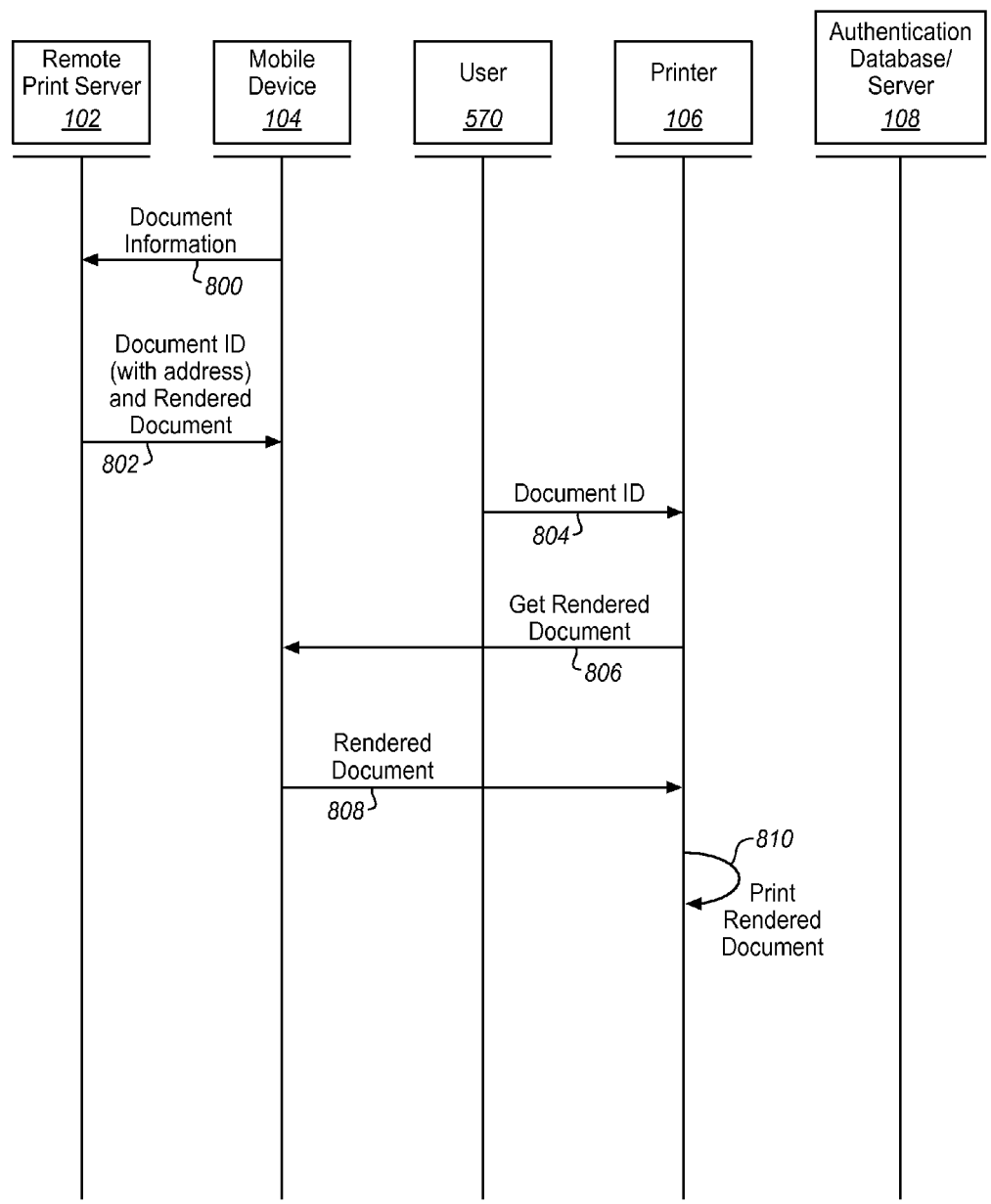

FIG. 8 is another exemplary message exchange diagram representing still another exemplary embodiment of features and aspects hereof to provide for flexible printing for a mobile device user in a printing enterprise. The message exchange of FIG. 8 is similar to other message exchanges described above but does not require any authentication of a user and uses a "generic" print driver in the server to render the document. Such an embodiment could be useful in an enterprise where the parameters to be used for printing are fixed or rarely changed. For example, some office environments may always print documents in black and white (no color) and always in duplex (two-sided) mode to conserve paper. In the message exchange of FIG. 8, message 800 is transmitted from mobile device 104 to remote print server 102 providing document information for the document to be printed as identified by a user of mobile device 104. Message 802 is returned from remote print server 102 to mobile device 104 providing the assigned unique document ID associated with the document information by the remote print server. The document ID comprises addressing information for the mobile device (e.g., the TCP/IP address or network media access address— "MAC address"). This addressing information may be used later in the exchange as discussed below. Further, remote print server 102 returns in message 802 the requested document rendered using the desired fixed set of printing parameters defined by the printing environment. Thus, no specific printer information or user selected options are required by remote print server 102 to render the document. This rendered document returned as a portion of message 802 may be stored in mobile device 104 for later retrieval by printer 106 as discussed below.

User 570 of mobile device 104 then transmits message 804 comprising the document ID to printer 106. As noted above, in this exemplary embodiment, printer 106 need not authenticate the user. Further, as noted above, the document ID includes addressing information required for printer 106 to continue communicating with mobile device 104. For example, a document ID may comprise a document identifier and a MAC address for mobile device 104 such as "00:23:76:0c:25:d6_July_Invoices_1" or may comprise the document identifier and a TCP/IP address such as "192.168.0.100_July_Invoices_1". Using message 806, printer 106 then requests the rendered document from mobile device 104 using the addressing information included in the document ID to address mobile device 104. The rendered document (rendered using the generic driver features of print server 102) is then returned from mobile device 104 to printer 106 as message 808. The rendered document is then printed on printer 106 as indicated my arrow/message 810.

Figure 9:
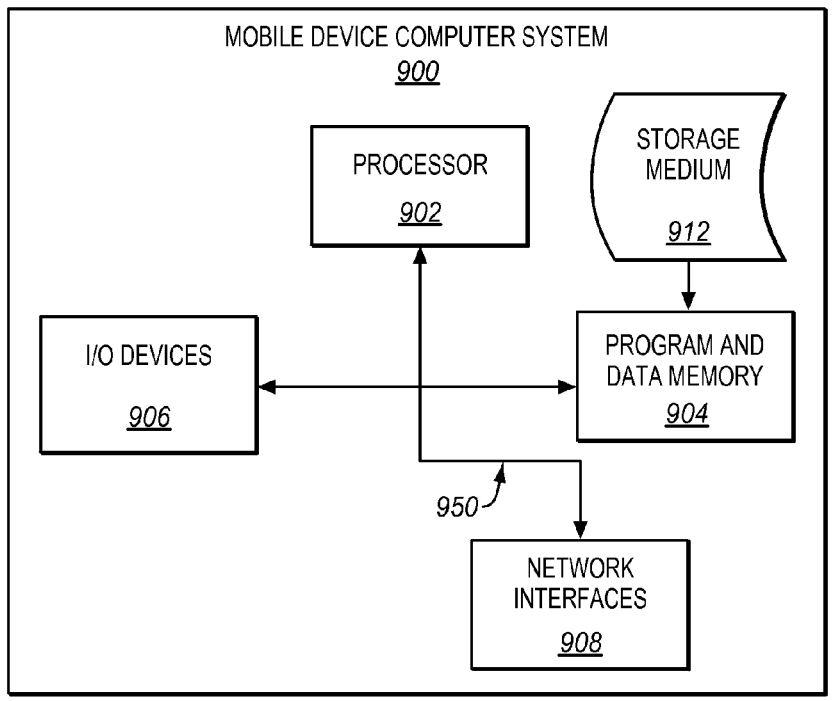
FIG. 9 is a block diagram of a mobile device computing system on which a computer readable medium may be used to receive program instructions for implementing methods in accordance with features and aspects hereof to improve flexibility for mobile device user in an enterprise to use printers of the enterprise and remote print servers.

Those of ordinary skill in the art will readily recognize numerous additional or equivalent messages as well as other orderings or sequences of the messages shown in FIGS. 5 through 8. Such alternative, equivalent, and additional messages are omitted herein for simplicity and brevity of this discussion Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 9 is a block diagram depicting a mobile device computer system 900 adapted to provide features and aspects hereof by executing programmed instructions and accessing data stored on a computer readable storage medium 912 for implementing one or more of the methods depicted herein.

Furthermore, embodiments of the invention can take the form of a computer program product accessible from a computer-usable or computer-readable medium 912 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 900 suitable for storing and/or executing program code will include at least one processor 902 coupled directly or indirectly to memory elements 904 through a system bus 950. The memory elements 904 can include local memory employed during actual execution of the program code, bulk storage, and cache memories, which provide temporary storage of at least some program code in order to reduce the number of times code must be retrieved from bulk storage during execution.

Input/output or I/O devices 906 (including but not limited to keyboards, displays, pointing devices, etc.) can be coupled to the system either directly or through intervening I/O controllers. Network adapter interfaces 908 may also be coupled to the system to enable the computer system 900 to be coupled with other data processing systems or storage devices through intervening private or public networks. Ethernet cards, WiFi interfaces, Bluetooth Interfaces, are just a few of the currently available types of network or host interface adapters.

Although specific embodiments were described herein, the scope of the invention is not limited to those specific embodiments. The scope of the invention is defined by the following claims and any equivalents thereof.

I claim:

1. A method for printing a document with a mobile device in a printing enterprise, the method comprising:
   obtaining, within the mobile device, document information identifying a document to be printed;
   authenticating the mobile device with a printer selected in the printing enterprise and coupled with the mobile device over a private network, wherein the authenticating includes:
      validating the mobile device with an authentication database of the printing enterprise;
      establishing addressing information for the mobile device in the private network based on an entry in the authentication database; and
      transmitting, to the mobile device, print capabilities from the printer selected in the printing enterprise based on the addressing information;
   transmitting the document information and the print capabilities from the mobile device to a remote print server coupled with the mobile device over a public network;
   receiving within the mobile device from the remote print server over the public network a rendered document generated by the remote print server based on the document information and the print capabilities of the printer selected in the printing enterprise; and
   transmitting the rendered document from the mobile device to the printer over the private network to cause the printer to print the rendered document wherein the private network is separate from the public network.

2. The method of claim 1 further comprising:
   generating the rendered document by operation of the remote print server based on the document information and using a generic printer driver in the remote print server.

3. The method of claim 1 further comprising:
   obtaining user credentials for a user of the mobile device; and
   validating the user's authority to print the identified document based on the user credentials.

4. The method of claim 3
   wherein the step of obtaining user credentials further comprises obtaining the user credentials by operation of the printer,
   wherein the step of validating further comprises locating, by operation of the printer, information corresponding to the user credentials in an authentication database coupled with the printer, wherein the located information includes addressing information regarding the mobile device for use by the printer to communicate with the mobile device through the private network.

5. The method of claim 4 further comprising:
   pushing printer information from the printer to the mobile device over the private network using the addressing information; and
   transmitting the printer information from the mobile device to the remote print server, the method further comprising:
   generating the rendered document by operation of the remote print server based on the document information and based on the printer information.

6. The method of claim 1
   wherein the step of obtaining the document information further comprises identifying a document on the mobile device, and
   wherein the step of transmitting the document information to the remote print server further comprises transmitting the document from the mobile device to the remote print server.

7. The method of claim 1
   wherein the step of obtaining the document information further comprises determining a Universal Resource Locator (URL) identifying a document to be printed,
   wherein the step of transmitting the document information to the remote print server further comprises transmitting the URL from the mobile device to the remote print server, and
   wherein the method further comprises:
   retrieving, by operation of the remote print server, the document identified by the URL; and
   generating, by operation of the remote print server, the rendered document based on the retrieved document.

8. The method of claim 1 further comprising:
   receiving within the mobile device from the remote print server over the public network one or more print options to be selected by a user of the mobile device;
   receiving user input within the mobile device to select desired print options based on the received one or more print options, the desired print options to be used by the remote print server to generate the rendered document;
   transmitting the desired print options from the mobile device to the remote print server over the public network prior to receipt of the rendered document; and
   generating the rendered document by operation of the remote print server based on the document information and based on the desired print options.

9. A system comprising a printing enterprise and a mobile device adapted for printing a document in the printing enterprise, the mobile device comprising: a private network interface adapted for coupling the mobile device with a printer selected in the printing enterprise over a private network; a public network interface adapted for coupling the mobile device with a remote print server over a public network; and a print job processor coupled with the private network through the private network interface and coupled with the public network through the public network interface, wherein the processor is adapted to obtain document information identifying a document to be printed, wherein the processor is further adapted to obtain print capabilities of a printer selected in the printing enterprise over the private network, the printer being adapted to authenticate the mobile device with an authentication database of the printing enterprise, to establish addressing information for the mobile device in the private network based on an entry in the authentication database, and to transmit, to the mobile device, print capabilities of the printer selected in the printing enterprise based on the addressing information; wherein the processor is further adapted to transmit the document information and the printer information to the remote print server over the public network, wherein the processor is further adapted to receive a rendered document from the remote print server over the public network wherein the rendered document is generated by the remote print server based on the document information and the print capabilities of the printer selected in the printing enterprise, and wherein the processor is further adapted to transmit the rendered document to the printer over the private network to cause the printer to print the rendered document.

10. The mobile device of claim 9
wherein the processor is further adapted to obtain the document information as an identified document stored on the mobile device, and
wherein the processor is further adapted to transmit the document information by transmitting the identified document to the remote print server over the public network.

11. The mobile device of claim 9
wherein the processor is adapted to obtain the document information as a Universal Resource Locator (URL) identifying a document to be printed, and
wherein the processor is further adapted to transmit the document information as the URL.

12. The mobile device of claim 9
wherein the processor is further adapted to receive from the remote print server over the public network one or more print options to be selected by a user of the mobile device,
wherein the mobile device further comprises:
a user input device coupled with the processor to receive input form a user of the mobile device,
wherein the processor is further adapted to receive user input to select desired print options based on the received one or more print options, and
wherein the processor is further adapted to transmit the desired print options to the remote print server over the public network prior to receipt of the rendered document.

13. A non-transitory computer readable medium embodying programmed instructions that, when executed by processors, cause a method for printing a document with a mobile device in a printing enterprise, the method comprising: obtaining, within the mobile device, document information identifying a document to be printed; authenticating the mobile device with a printer selected in the printing enterprise and coupled with the mobile device over a private network, wherein the authenticating includes: validating the mobile device with an authentication database of the printing enterprise; establishing addressing information for the mobile device in the private network based on an entry in the authentication database; and transmitting, to the mobile device, print capabilities from the printer selected in the printing enterprise based on the addressing information; transmitting the document information and the print capabilities from the mobile device to a remote print server coupled with the mobile device over a public network; receiving within the mobile device from the remote print server over the public network a rendered document generated by the remote print server based on the document information and the print capabilities of the printer selected in the printing enterprise; and transmitting the rendered document from the mobile device to the printer over the private network to cause the printer to print the rendered document wherein the private network is separate from the public network.

14. The medium of claim 13
wherein the rendered document is generated by the remote print server based on the document information and by using a generic printer driver in the remote print server.

15. The medium of claim 13
wherein the method step of obtaining the document information further comprises identifying a document on the mobile device, and
wherein the method step of transmitting the document information to the remote print server further comprises transmitting the document from the mobile device to the remote print server.

16. The medium of claim 13
wherein the method step of obtaining the document information further comprises determining a Universal Resource Locator (URL) identifying a document to be printed,
wherein the method step of transmitting the document information to the remote print server further comprises transmitting the URL from the mobile device to the remote print server
wherein the rendered document is generated by the remote print server based on the retrieved document.

17. The medium of claim 13 the method further comprising:
receiving within the mobile device from the remote print server over the public network one or more print options to be selected by a user of the mobile device;
receiving user input within the mobile device to select desired print options based on the received one or more print options, the desired print options to be used by the remote print server to generate the rendered document; and
transmitting the desired print options from the mobile device to the remote print server over the public network prior to receipt of the rendered document,
wherein the rendered document is generated by the remote print server based on the document information and based on the desired print options.

\* \* \* \* \*